US012486965B2

(12) United States Patent
Bilous

(10) Patent No.: US 12,486,965 B2
(45) Date of Patent: Dec. 2, 2025

(54) ILLUMINATION DEVICE HAVING CAP WITH PROTRUSIONS COUPLED TO RECESS IN FRAME WALLS

(71) Applicant: Nazar Bilous, Lviv (UA)

(72) Inventor: Nazar Bilous, Lviv (UA)

( * ) Notice: Subject to any disclaimer, the term of this patent is extended or adjusted under 35 U.S.C. 154(b) by 0 days.

(21) Appl. No.: 18/992,022

(22) PCT Filed: May 10, 2023

(86) PCT No.: PCT/UA2023/000026
§ 371 (c)(1),
(2) Date: Jan. 7, 2025

(87) PCT Pub. No.: WO2024/039359
PCT Pub. Date: Feb. 22, 2024

(65) Prior Publication Data
US 2025/0172274 A1 May 29, 2025

(30) Foreign Application Priority Data
Aug. 17, 2022 (UA) .............................. a 2022 02992

(51) Int. Cl.
*F21V 11/06* (2006.01)
*F21V 17/10* (2006.01)
(Continued)

(52) U.S. Cl.
CPC ............ *F21V 11/06* (2013.01); *F21V 17/101* (2013.01); *F21Y 2105/12* (2016.08); *F21Y 2115/10* (2016.08)

(58) Field of Classification Search
CPC ........ F21V 17/005; F21V 11/06; F21V 15/01; F21V 17/10; G09F 13/0413; G09F 13/0409; G09F 13/04; G09F 13/0404
See application file for complete search history.

(56) References Cited

U.S. PATENT DOCUMENTS 7,473,016 B2 * 1/2009 Flaherty .................. F21S 8/083 362/555
8,057,072 B2 * 11/2011 Takenaka .................. F21K 9/00 362/249.02
(Continued)

FOREIGN PATENT DOCUMENTS

CN 104776344 A 7/2015
CN 107806586 A 3/2018
(Continued)

OTHER PUBLICATIONS

PCT International Search Report for International Application No. PCT/UA2023/000026, mailed Sep. 7, 2023, 4pp.
(Continued)

*Primary Examiner* — Ismael Negron
(74) *Attorney, Agent, or Firm* — The Roy Gross Law Firm, LLC; Roy D. Gross

(57) ABSTRACT

The illumination device includes a frame having opaque walls forming at least two mutually isolated zones, at least one lighting source mounted in at least one of the isolated zones, a light-diffusing film covering a top portion of the frame and including holes, and an at least translucent cap covering the light-diffusing film having an inner side provided with protrusions. The protrusions extend through the holes provided in the film to recesses provided in the frame walls, and at least a part of the protrusions is coupled to the frame walls.

11 Claims, 6 Drawing Sheets

(51) Int. Cl.

| | |
|---|---|
| *F21Y 105/12* | (2016.01) |
| *F21Y 115/10* | (2016.01) |

(56) References Cited

U.S. PATENT DOCUMENTS

| | | | | |
|---|---|---|---|---|
| 8,328,391 | B2 * | 12/2012 | Snijder | F21V 11/06 362/97.3 |
| 9,134,004 | B2 * | 9/2015 | Wacholder | F21V 13/04 |
| 11,109,583 | B2 * | 9/2021 | Parnell | F21V 3/00 |
| 2004/0022058 | A1 * | 2/2004 | Birrell | F21V 21/096 362/249.01 |
| 2012/0320579 | A1 * | 12/2012 | Ferguson | F21V 29/67 362/355 |
| 2019/0137678 | A1 * | 5/2019 | Weeda | G09F 13/04 |

FOREIGN PATENT DOCUMENTS

| | | | |
|---|---|---|---|
| EA | 200801964 | A1 | 2/2009 |
| EP | 2924334 | A1 | 9/2015 |
| JP | 2009211810 | A | 9/2009 |
| JP | 2013025890 | A | 2/2013 |
| WO | 2007066260 | A1 | 6/2007 |
| WO | 2013035012 | A2 | 3/2013 |
| WO | 2021001692 | A1 | 1/2021 |

OTHER PUBLICATIONS

PCT Written Opinion for International Application No. PCT/UA2023/000026, mailed Sep. 7, 2023, 4pp.

* cited by examiner

ILLUMINATION DEVICE HAVING CAP WITH PROTRUSIONS COUPLED TO RECESS IN FRAME WALLS

CROSS REFERENCE TO RELATED APPLICATIONS

This application is a National Phase of PCT Patent Application No. PCT/UA2023/000026 having International filing date of May 10, 2023, which claims the benefit of priority of Ukrainian Patent Application No. a 2022 02992, Aug. 17, 2022, the contents of which are all incorporated herein by reference in their entirety.

The invention relates to a field of illumination and displaying technologies, in particular, to a structure of an illumination device which, owing to an arrangement of a lighting source within isolated zones, allows not only to illuminate a space, but also to display information, static and dynamic images. The information is displayed by illuminating defined isolated zones, while other isolated zones remain non-illuminated or are illuminated with a light of another color. The illumination may be continuous or controllable by means of a controller. These zones form pixels which may build a certain static or dynamic image which could be a text, geometric figures, animal figures, visual effects etc. Several illumination devices may be combined into a single system having a shared control center, thereby allowing to form large-area structures, where each illumination device displays a defined part of the overall image.

International application WO2021001692 teaches a luminaire comprising a frame having opaque walls which form at least two mutually isolated zones. At least one lighting source, e.g., a light-emitting diode, is mounted in each of these zones. These LEDs may illuminate with a color other than a color of the LED of the adjacent zone. A thin light-diffusing film covers a top portion of the frame. Said film is intended to make the light of each isolated zone more uniform, while at the same time avoiding it from mixing with the light that comes from the adjacent isolated zone. In turn, the light-diffusing film is covered by a cap that is at least partially permeable for the light that comes from the lighting sources. Said cap presses the light-diffusing film to the frame and protects it against damages. This solution has been taken as the closest analogue of the claimed invention.

A drawback of the described solution is that when turning the lighting source on, a different clarity of alternations between adjacent isolated zones is observed at the illumination device surface, as well as the light from the isolated zones, where the lighting source is turned on, is partially spread to the isolated zones, where the lighting source is turned off. In view of this, at the surface of the illumination device, it is observed that the isolated zones are displayed non-uniformly within the adjacent isolated zones of the same light color, as well as the clarity of the isolated zones contours is deteriorated and a pixel quality of the full image that is created by one or more zones is lost along with the clarity of the image. This is caused by a loose fitting between the light-diffusing film and the frame, especially at a center of the illumination device, where a natural convexity between the frame and the cap is formed. Therewith, the drawback is enhanced when the area of the illumination device is increased.

An obvious option is to adhere the light-diffusing film, e.g., by means of an adhesive strip or a glue which will complicate a manufacturing process, since it will require to perform additional preparation operations and to apply said materials to the device frame or light-diffusing film, it will require to control the quality of the glue and of the adhesive strip, it will require to follow temperature regimens and the corresponding humidity of the air which will ensure an optimal gluing environment. Considering the fact that the frame consists of a significant number of the isolated zones, where each of them is formed by the frame walls, defects during application of the glue or during adhering the adhesive strip become more probable, while risks of having a non-reliable and short-living gluing are increased in view of lack of the corresponding control of the glue and adhesive strip quality, as well as of the temperature regimen and humidity. Besides, the glue and the adhesive strip eventually lose their gluing properties, thereby making the device less reliable and reducing the time during which the device is capable of performing the functions assigned thereto. Use of the additional materials and conduction of the operations related therewith, creation of the special gluing conditions and control of the glue and adhesive strip quality increase the risk that the defects will arise when assembling the devices, as well increase a total price per one piece.

Therefore, an objective of the present invention is to provide such an illumination device structure that would enable to achieve a technical effect of providing a uniformity of displaying the isolated zones with identical clear walls between the isolated zones that would eventually provide a high clarity of the obtained image, in other words, a high information displaying quality. Besides, an additional technical effect is a simplification of a process for assembling the illumination device, increase of its reliability and durability, and making the manufacturing of the illumination device cheaper.

The objective is achieved by an illumination device structure as described hereinafter. The illumination device comprises a frame having opaque walls which form at least two mutually isolated zones, at least one lighting source that is mounted in at least one of the isolated zones, a light-diffusing film that covers a top portion of the frame, and a cap that covers the light-diffusing film and is at least partially permeable for a light that comes from the lighting sources, wherein an inner side of the cap is provided with protrusions, the film is provided with holes that correspond to the protrusions, the frame walls, from their top edges, are provided with recesses which correspond to the protrusions, and the protrusions extend through the holes provided in the film to the recesses provided in the frame walls, and at least one of the protrusions is coupled to the frame wall.

The described fixation of the light-diffusing film and the cap to the frame ensures a tight fitting of this film across the entire plane of the illumination device and enables to create a solid structure that prevents the light from the adjacent isolated zones against mixing, provides the uniform displaying of the adjacent isolated zones with identical clear walls between the isolated zones which results in achieving a high clarity of the displayed image, i.e., a high information displaying quality.

According to one of preferable embodiments of the illumination device, the recesses provided in the frame walls from their top edges are provided at an intersection of the frame walls. The arrangement of the recesses at the intersection of the frame walls enables to make them with a larger diameter compared to if they would be arranged at the wall edge, as well as to increase the reliability of the coupling. Also, it enables to make the walls as thin as possible, thereby increasing the uniformity of displaying of the adjacent isolated zones, when they are illuminated with the same color. Besides, in this way, volumes of raw materials required for the manufacturing of the frame are reduced.

According to one of preferable embodiments of the illumination device, the protrusions which are arranged at the inner side of the cap are coupled to the frame walls by means of an ultrasonic welding.

According to one of preferable embodiments of the illumination device, the at least one lighting source is mounted in each of the isolated zones.

According to one of preferable embodiments of the illumination device, the protrusions which are arranged at the inner side of the cap and coupled to the frame walls are arranged in a central part of the cap. Considering the fact that the cap is usually made of a thin polymer material, it may bend when its area is increased, and the topmost bending point is usually located in its central part. The arrangement of the protrusions which couple the cap to the frame walls in the central part enables to eliminate the described effect to the maximum extent, while consuming less amount of the additional material that is required for manufacturing the cap compared to if these protrusions would be arranged at the entire plane of the cap. Besides, when the protrusions are arranged at the central part of the cap, a distance between them is less compared to if they wound be arranged across the entire plane of the cap, thereby ensuring that possible deviations between their planned and actual arrangement at the plane of the cap will not be significant, thereby enabling to minimize a risk that the protrusions will not enter the holes of the light-diffusing film and to the recesses provided in the frame walls, as well as defects due to impossibility of assembling the device.

A shape and dimensions of the holes provided in the film correspond to a shape and dimensions of cross-sections of the corresponding protrusions, while the recesses provided in the frame walls are preferably shaped and dimensioned so as to correspond to the protrusions. Nevertheless, there are other embodiments, for example, when the rod-shaped protrusion has a parallelepiped shape, while the protrusion has a cylinder shape, and this parallelepiped fits into this cylinder or vice versa. One' of the embodiments is to provide the recess in the frame walls with a greater diameter than the diameter of the corresponding protrusions, while a height of these protrusions is greater that a depth of the corresponding recesses.

According to one of preferable embodiments of the illumination device, the protrusions which are arranged at the inner side of the cap (i.e., at the side that is faced towards the lighting sources) and coupled to the frame may have a shape of cylinders or parallelepipeds or cones or a needle-like shape, while the holes provided in the film have a shape of the cross-sections of the protrusions.

According to one of preferable embodiments of the illumination device, the at least one protrusion that is arranged at the inner side of the cap that is not coupled to the frame has a semi-spherical shape, while the holes provided in the light-diffusing film have the shape of the cross-sections of the protrusions. These protrusions at the cap along with the corresponding holes provided in the film and the recesses provided in the frame walls make a correct positioning of the structure components relative to each other during their assembling easier. Therewith, if the protrusions are made semi-spherical, it will enable to solve a problem of errors of arrangement of the holes at the film, of the protrusions at the inner side of the cap and of the recesses at the top edges of the frame walls relative to each other, which could arise during manufacturing of these pieces. If the hole at the surface of the light-diffusing film is slightly biased relative to the semi-spherical protrusion, the light-diffusing film will partially overlap the surface of the semi-spherical protrusion without damaging the light-diffusing film which would not be possible to achieve if the protrusion would have another shape. Besides, if the semi-spherical protrusion is biased and it gets to the edge of the frame wall, where there is no recess, the semi-spherical shape reduces the probability that the fitting will occur in the topmost point of the protrusion. In this way, the probability of arising of convexities at the cap surface is minimized, but if they arise, they will have much less height than in case if the protrusions at the inner side of the cap would have the shape of cylinder, parallelepiped or another stereometric figure.

According to one of preferable embodiments of the illumination device, the protrusions which are arranged at the inner side of the cap have different shapes.

In particular, as mentioned above, the protrusions which are coupled to the frame of the illumination device may have the shape of cylinders or parallelepipeds, while the protrusions which are not coupled to the frame may have the semi-spherical shape. In this way, the protrusions which are coupled to the frame ensure the integrity of fitting of the light-diffusing film and its correct positioning, i.e., the spatial arrangement of the light-diffusing film, if there are more than one protrusion. The protrusions which are not coupled to the frame ensure the correct positioning of the light-diffusing film.

According to one of preferable embodiments of the illumination device, the protrusions which are arranged at the inner side of the cap have different widths. The different width of the protrusions enables to optimize the consumption of the raw materials required to manufacture the cap.

Besides, the protrusions which are arranged at the inner side of the cap may have the same widths. In this way, all the protrusions have the same visual appearance, thereby ensuring a uniform visual appearance of the illumination device surface and enabling to enhance an aesthetic visual appearance of the illumination device.

According to one of preferable embodiments of the illumination device, the protrusions which are arranged at the inner side of the cap have different heights. Usually, the protrusions which are not coupled to the frame may have smaller height, since there is no need in additional raw materials for providing the coupling, in particular, for welding.

The light-diffusing film may be made of a transparent dense plastic or using PET film having a corresponding light-diffusing coating/spraying which diffuses the light uniformly across the pixel area without hot points, and this film may have a length of less than 1 mm. In turn, the cap is transparent or at least partially transparent and does not hinder the visual effect that is created by the light-diffusing film.

A bottom portion of the frame may be successively covered by a printed circuit board (PCB) which the lighting sources, preferably LEDs, are mounted on and which may be controlled by a controller, and by a cap that protects the board and enables to connect the illumination device to the lighting source and/or to the controller. The number of the lighting sources may correspond to the number of the isolated zones, and it may be greater or smaller. In this way, one or more lighting sources may be arranged within the single isolated zone, or the isolated zone may not have any lighting source.

It should be appreciated that the claimed illumination device as defined in the appended claims is not necessarily limited by the above-described specific features and embodiments. Instead, the above-described specific features and embodiments are disclosed as exemplary implementations of the claims, and other equivalent features may be encompassed by the present claims.

The present invention will be described hereinafter in more detail by the following figures.

Figure 1:
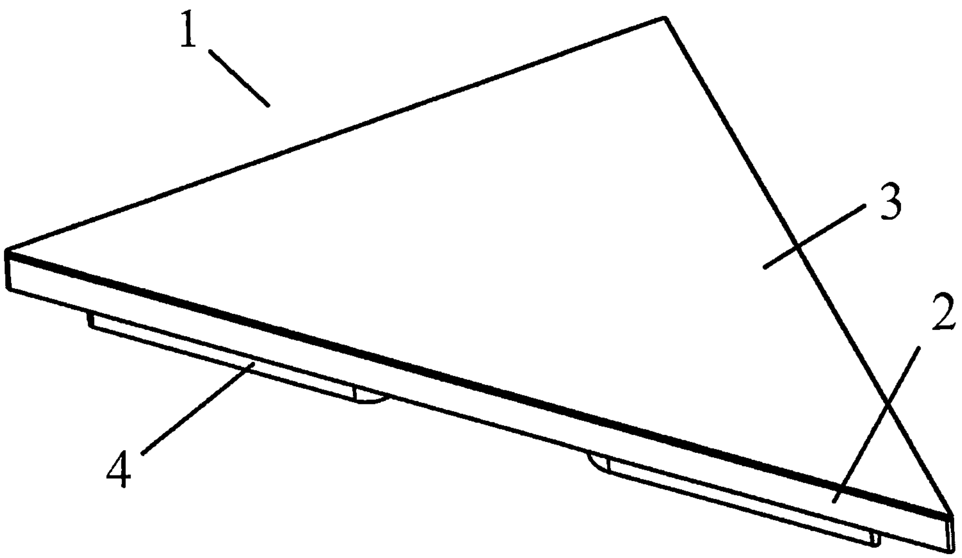
FIG. 1 illustrates an overall view of the assembled illumination device according to one of preferable embodiments of the present invention.

FIG. 1 illustrates an overall view of an assembled illumination device 1 according to a preferable embodiment of the claimed invention. The illumination device 1 has an overall shape of a triangular right prism and comprises a frame 2, a cap 3 that covers a top portion of the frame 2, and a cap 4 that covers a bottom portion of the frame 2 and a printed circuit board (PCB) having lighting sources mounted thereon.

Figure 2:
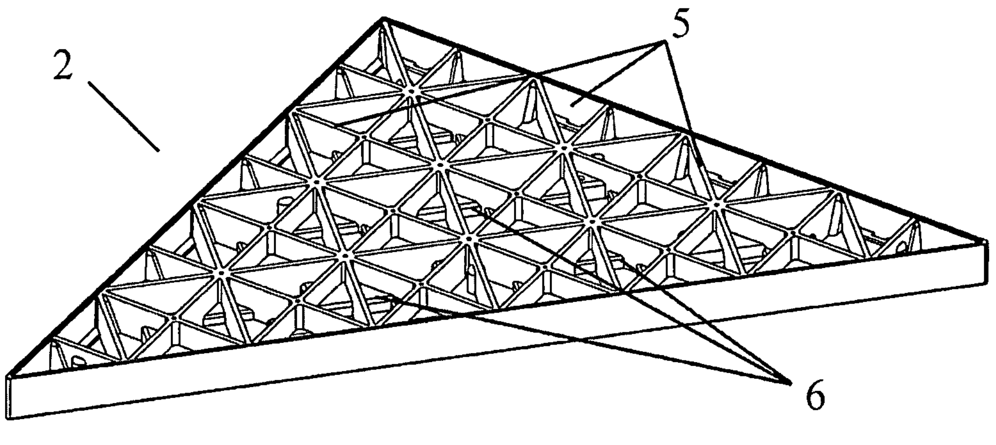
FIG. 2 illustrates an overall view of the frame depicted on FIG. 1.
Figure 3:
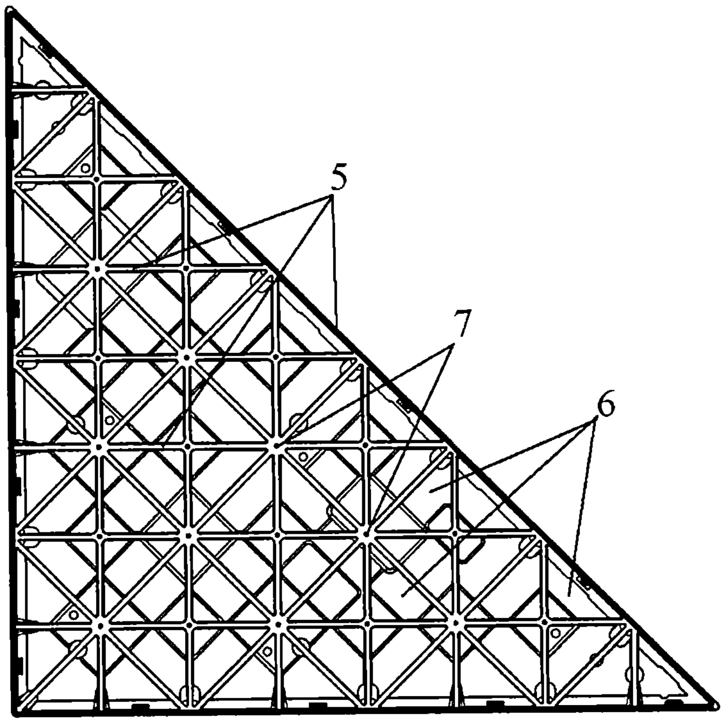
FIG. 3 illustrates a top view of the frame depicted on FIG. 1.

FIG. 2 and FIG. 3 illustrate an overall view and a top view of the frame 2 depicted on FIG. 1. It can be seen from these figures that the frame has walls 5. The walls 5 may be external walls which define a shape of the illumination device 1 and internal walls which along with other internal walls or adjacent external walls form isolated zones 6. Besides, FIG. 3 indicates recesses 7 provided in the walls 5 of the frame from a side of their top edges. According to this embodiment, the recesses 7 are provided at an intersection of the walls, however, it is obvious that these recesses may be also provided at areas of the walls which are arranged between the intersection areas if a thickness of the walls allows to do so.

Figure 4:
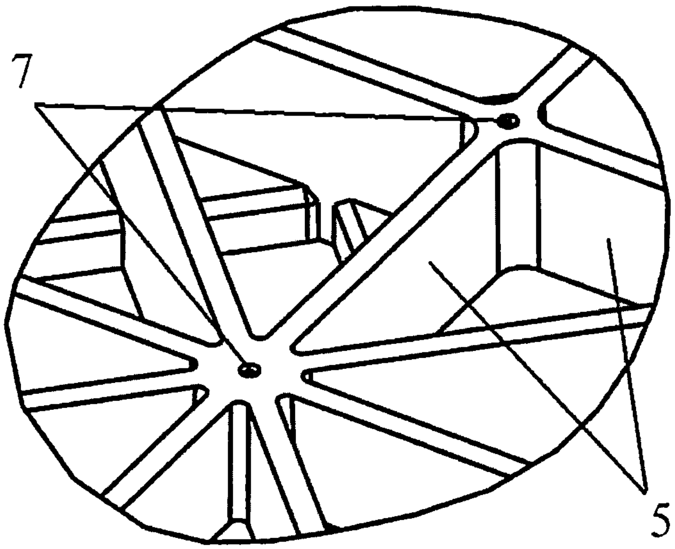
FIG. 4 illustrates an enlarged view of the frame depicted on FIG. 2 and FIG. 3.

FIG. 4 illustrates an enlarged view of the frame 2 depicted on FIG. 2 and FIG. 3. It can be seen from this figure that the recesses 7 provided in the walls 5 of the frame 2 have a circular shape as seen in a cross-section.

Figure 5:
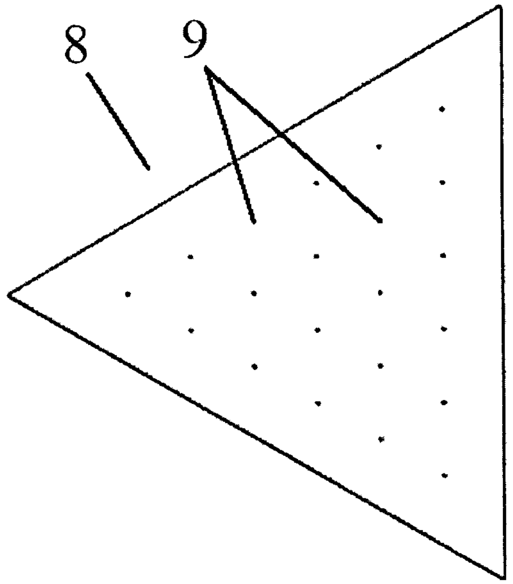
FIG. 5 illustrates an overall view of the light-diffusing film that corresponds to the frame depicted on FIG. 2 and FIG. 3.
Figure 6:
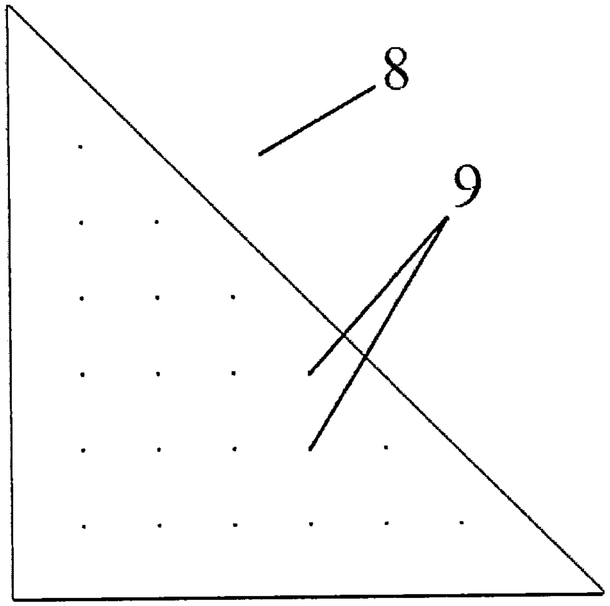
FIG. 6 illustrates a top view of the light-diffusing film depicted on FIG. 5.

FIG. 5 and FIG. 6 illustrate an overall view and a top view of the light-diffusing film 8 that corresponds to the frame depicted on FIG. 2. It can be seen that holes 9 are provided in the film. A position of these holes corresponds to a position of the recesses 7 illustrated on FIG. 3.

Figure 7:
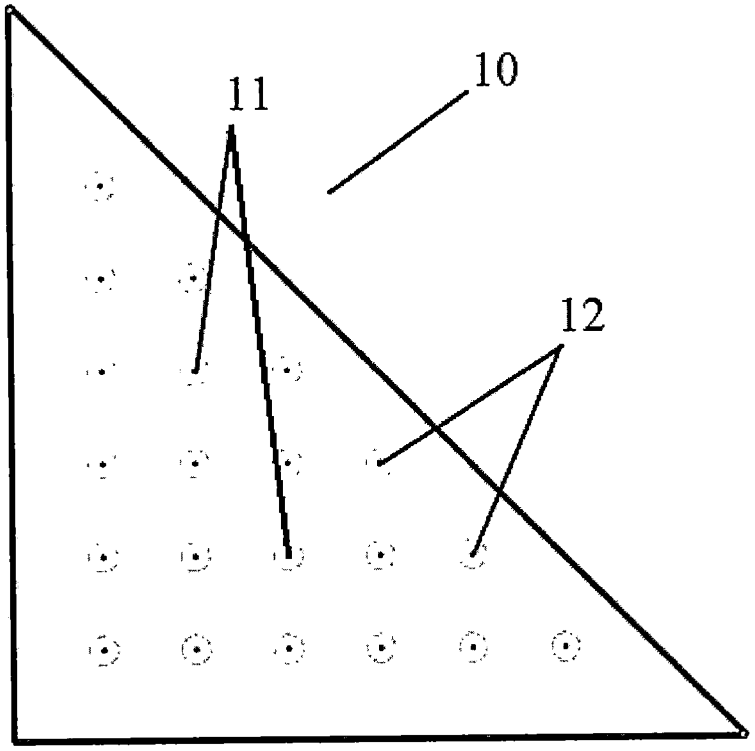
FIG. 7 illustrates a bottom view of the cap that covers the light-diffusing film depicted on FIG. 5 and FIG. 6.
Figure 8:
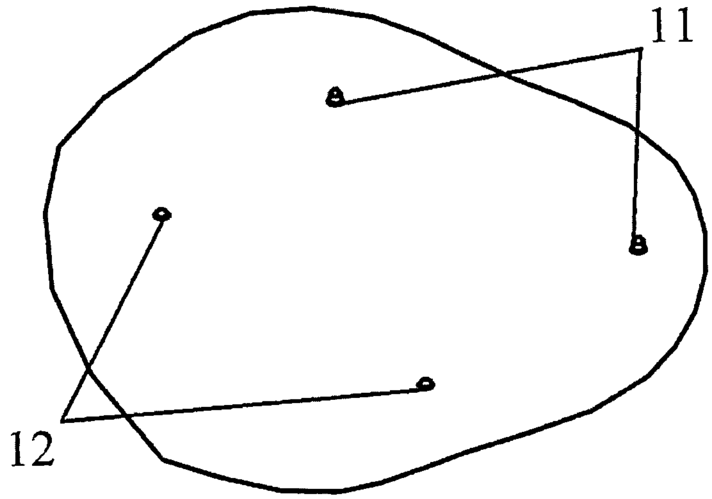
FIG. 8 illustrates an enlarged view of an area of the cap depicted on FIG. 7.

FIG. 7 illustrates a bottom view (from the inner side) of the cap 3 that covers the light-diffusing film 8 depicted on FIG. 5 and FIG. 6. Positions 11 and 12 indicate the protrusions having different height (longer and shorter ones) which correspond to the recesses 7 provided in the walls 5 of the frame (see FIG. 3 and FIG. 4) respectively. Since the protrusions 11 and 12 have the same cross-section shape and dimension, this difference between the lengthwise dimensions is not visible on FIG. 7. In order to make this difference visible, FIG. 8 illustrates an enlarged view of the area of the cap 10 having the longer protrusions 11 and the shorter protrusions 12.

Figure 9:
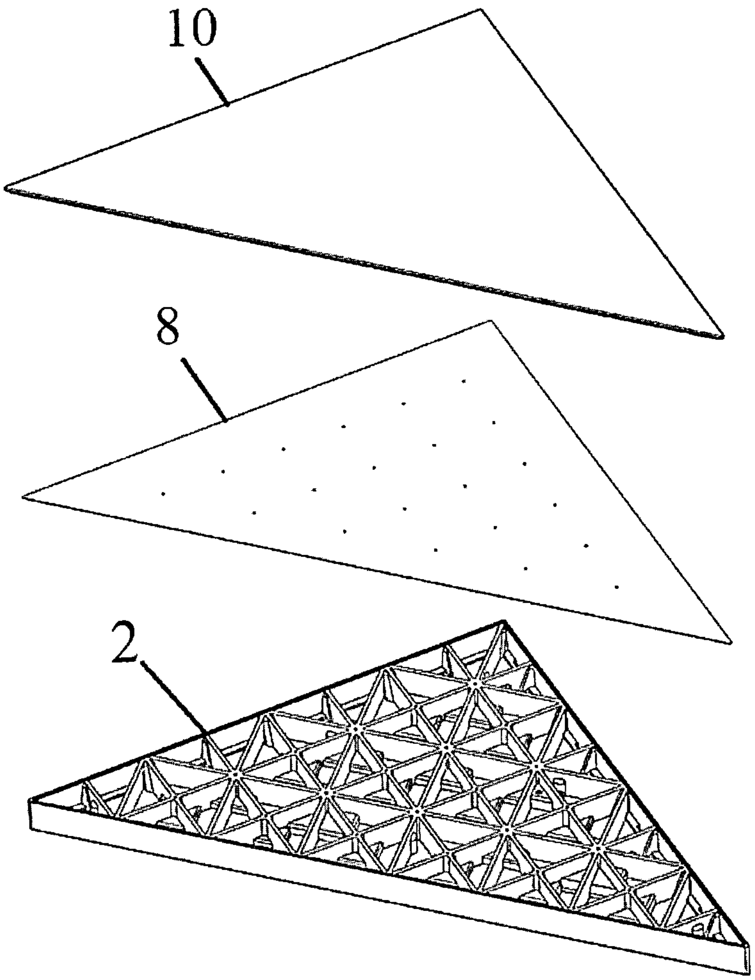
FIG. 9 illustrates a view of the top portion of the illumination device depicted on FIG. 1 with the components depicted in an exploded view.

FIG. 9 illustrates a view of the top portion of the illumination device 1 illustrated on FIG. 1 with the components depicted in an exploded view. This figure illustrates the frame 2, the light-diffusing film 8 and the cap 3.

Figure 10:
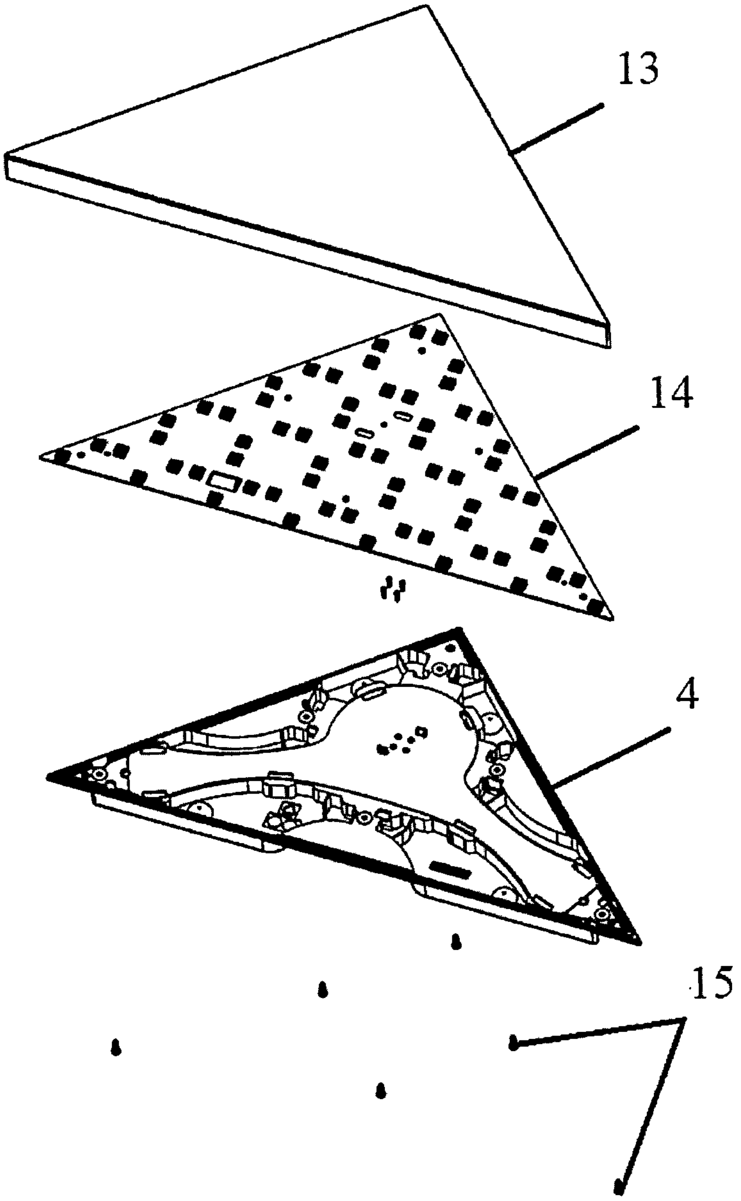
FIG. 10 illustrates an overall view of the illumination device with the components of the bottom portion depicted in an exploded view.

FIG. 10 illustrates the illumination device 1 with the components of its bottom portion depicted in an exploded view. A position 13 on said figure indicates the frame 2 with the light-diffusing film 8 and the cap 3 depicted on FIG. 9 in an assembled state, a position 14 indicates the printed circuit board with LEDs which are controllable by a controller mounted thereon, a position 4 indicates a cap that covers the printed circuit board 14 and, thus, the frame 2 from the bottom. Said elements are fixed by means of screws 15.

The structural elements of the illumination device 1 are assembled in the following way.

The frame 2 is covered with the light-diffusing film 8 having a shape and dimensions which coincide with a shape and dimensions of the top portion of the frame 2, thereby positioning the corresponding holes 9 provided in the film 8 and the recesses 7 provided in the frames 5 of the wall 2 opposite to each other. Then, a top of the light-diffusing film is covered with the cap 3, thereby enabling the protrusions 11 and 12 of said cap 3 to extend through the holes 9 provided in the film 8 and positioning of said protrusions within the recesses 7 correspondingly.

Another alternative embodiment is possible, where the light-diffusing film 8 is firstly applied onto an inner portion of the cap 3, thereby enabling the protrusions 11 and 12 of said cap 3 to extend through the holes 9 provided in the film 8, and then the light-diffusing film 8 with the cap 3 is applied onto the upper portion of the frame 2, thereby positioning said protrusions within the recesses 7 correspondingly.

Therefore, the process of assembling the frame 2, the light-diffusing film 8 and the cap 3 is quick and simple. According to the second above-mentioned embodiment of the assembling, the process may be simplified even more by preliminary magnetizing the light-diffusing film 8 and ensuring its tight fitting to the inner portion of the cap 3.

Then, the obtained structure is positioned within a plastic ultrasonic welding device, thereby providing fusing of the protrusions (preferably, the protrusions 11) with the walls 5 of the frame 2 and, thus, obtaining the structure 13.

Afterwards, said structure 13 is assembled to the printed circuit board 14 and to the cap 4. Said elements are fixed by means of screws 15.

In this way, the solid structure is obtained which enables the tight fitting of the light-diffusing film 8 to the frame 2 across the entire plane and, thus, the high clarity of the image that is obtained during operation of the illumination device 1.

The invention claimed is:

1. An illumination device comprising:

a frame having opaque walls which form at least two mutually isolated zones, recesses provided at top edges of the walls;

at least one lighting source that is mounted in at least one of the isolated zones;

a light-diffusing film that covers a top portion of the frame, the film including holes; and a cap that covers the light-diffusing film and is at least partially permeable for a light that comes from the lighting sources, the cap having an inner side provided with protrusions that correspond with the holes and the recesses, wherein the protrusions extend through the holes provided in the film to the recesses provided in the frame walls, and at least one of the protrusions is coupled to the frame wall.

2. The device according to claim 1, wherein the recesses are provided at an intersection of the frame walls.

3. The device according to claim 1, wherein the protrusions are coupled to the frame walls by means of an ultrasonic welding.

4. The device according to claim 1, wherein the at least one lighting source is mounted in each of the isolated zones.

5. The device according to claim 1, wherein the protrusions which are coupled to the frame walls are arranged in a central part of the cap.

6. The device according to claim 1, wherein the protrusions which are coupled to the frame walls have a shape of cylinders or parallelepipeds or cones or a needle-like shape, while the holes provided in the film have a shape of cross-sections of the protrusions.

7. The device according to claim 1, wherein at least one of the protrusions is not coupled to the frame and has a semi-spherical shape, while the holes provided in the film have the shape of cross-sections of the protrusions.

8. The device according to claim 1, wherein the protrusions have different shapes.

9. The device according to claim 1, wherein the protrusions have different widths.

10. The device according to claim 1, wherein the protrusions have different heights.

11. The device according to claim 1, wherein the protrusions have the same widths.

* * * * *